US008789107B2

(12) United States Patent
Whitehead

(10) Patent No.: US 8,789,107 B2
(45) Date of Patent: Jul. 22, 2014

(54) INTELLIGENT AUTOMATIC DIGITAL VIDEO RECORDER

(75) Inventor: Steven D. Whitehead, Hudson, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 447 days.

(21) Appl. No.: 12/108,613

(22) Filed: Apr. 24, 2008

(65) Prior Publication Data

US 2009/0178071 A1     Jul. 9, 2009

Related U.S. Application Data

(60) Provisional application No. 61/020,144, filed on Jan. 9, 2008.

(51) Int. Cl.
    *G06F 3/00*      (2006.01)
    *G06F 13/00*      (2006.01)
    *H04N 5/445*      (2011.01)

(52) U.S. Cl.
     USPC ........ 725/46; 725/9; 725/10; 725/11; 725/12; 725/13; 725/14; 725/15; 725/16; 725/17; 725/19; 725/20; 725/21; 725/32; 725/33; 725/34; 725/35; 725/45; 725/102; 725/133; 725/134; 725/141; 725/142; 725/153; 386/291; 386/296

(58) Field of Classification Search
     USPC .............. 725/32–35, 45–46, 9–21, 102, 725/133–134, 141–142, 153; 386/291, 296
See application file for complete search history.

(56) References Cited

U.S. PATENT DOCUMENTS

| | | | | |
|---|---|---|---|---|
| 7,218,839 | B2* | 5/2007 | Plourde et al. | 386/291 |
| 7,260,823 | B2* | 8/2007 | Schlack et al. | 725/9 |
| 7,904,924 | B1* | 3/2011 | de Heer et al. | 725/46 |
| 2002/0129368 | A1* | 9/2002 | Schlack et al. | 725/46 |
| 2005/0138658 | A1* | 6/2005 | Bryan | 725/46 |
| 2005/0149987 | A1* | 7/2005 | Boccon-Gibod et al. | 725/135 |
| 2006/0212895 | A1* | 9/2006 | Johnson | 725/12 |
| 2007/0033607 | A1* | 2/2007 | Bryan | 725/10 |

OTHER PUBLICATIONS

"How to set up a Season Pass™ recording", http://www.3.tivo.com/mytivo/howto/getthemostoutoftv/howto_setup_seasonpass_recordin . . . , printed on Apr. 24, 2008, pp. 1-2.
"How to create a WishList™ search", http://www.3.tivo.com/mytivo/howto/getthemostoutoftv/howto_create_wishlist_search.html, printed on Apr. 24, 2008, pp. 1-2.
"How to find great new shows with TiVo® Suggestions", http://www.3.tivo.com/mytivo/howto/getthemostoutoftv/howto_use_suggestions.html, printed on Apr. 24, 2008, pp. 1-2.

* cited by examiner

*Primary Examiner* — Yassin Alata

(57) ABSTRACT

A system measures a frequency with which a user views a television program and identifies the television program as one of the user's favorite programs based on the measured frequency. The system automatically records, without intervention of the user, the one of the user's favorite programs.

24 Claims, 8 Drawing Sheets

| USER IDENTIFIER 410 | VIEWING BEHAVIOR INFO 415 | CONTENT INTEREST PROFILE 420 | OTHER INFO 425 | FAVORITE PROGRAMS 430 | PROGRAMS OF INTEREST 435 |
|---|---|---|---|---|---|
| user_ID_1 | | | | | |
| user_ID_2 | | | | | |
| user_ID_3 | | | | | |
| user_ID_4 | | | | | |

TABLE 400

ENTRIES 405

FIG. 4

INTELLIGENT AUTOMATIC DIGITAL VIDEO RECORDER

CROSS REFERENCE TO RELATED APPLICATION

This application claims priority to U.S. Provisional Patent Application No. 61/020,144, filed Jan. 9, 2008, the disclosure of which is incorporated by reference herein in its entirety.

BACKGROUND

Video recording devices, such as, for example, digital video recorders (DVRs), have become a widespread means for television viewers to record selected television (TV) programs in their homes. Typically, a given viewer that desires to record a selected TV program manually selects the TV program via a user interface associated with the viewer's DVR. Based on this manual programming, the DVR, at the appropriate time, digitally records the TV program manually selected by the viewer.

BRIEF DESCRIPTION OF THE DRAWINGS

FIG. 4 is a diagram of an exemplary table that may be stored in a user profile database of FIG. 2;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein provide DVR recording functionality that automatically, without a request by the user, may record selected television programs for a given user based on, among other information, the user's past program viewing behavior. The embodiments described herein, thus, may record television programs that a user failed to manually program their DVR to record without any specific request or intervention by the user.

Figure 1:
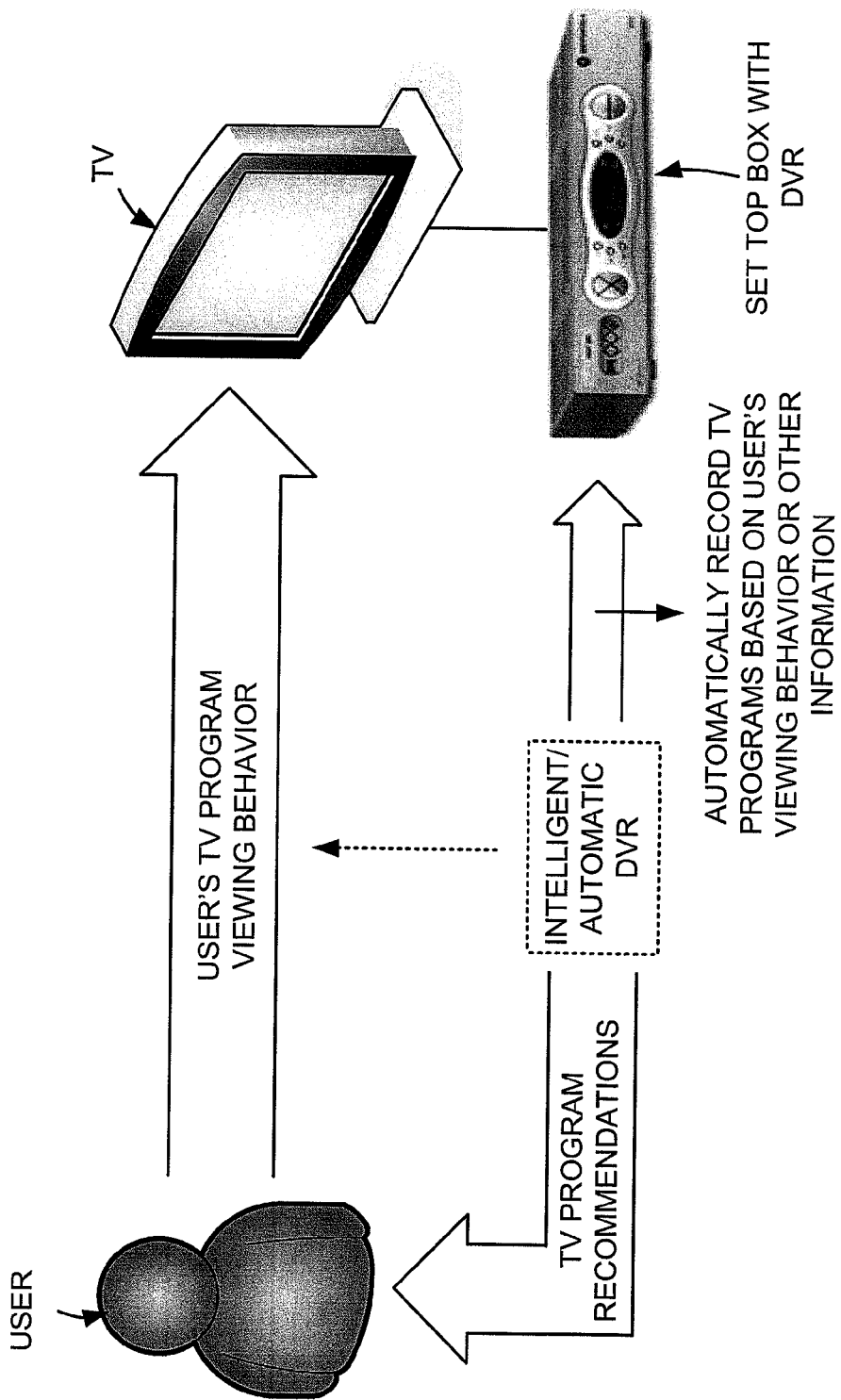
FIG. 1 is a diagram of an overview of an exemplary embodiment described herein.

FIG. 1 is a diagram of an overview of an exemplary embodiment described herein in which, among other information, a user's television program viewing behavior is used as a basis for automatically recording television programs. As shown in FIG. 1, intelligent/automatic DVR (IA-DVR) functionality may monitor a user's TV program viewing behavior and may cause a DVR associated with a set top box to automatically record selected TV programs. The IA-DVR functionality may reside internally or externally to the set top box. The IA-DVR may obtain other information related to the user, or to the user's viewing behavior, and may cause selected TV programs to be automatically recorded based additionally, or alternatively, on this other information. The IA-DVR may also consider resources that are available on the DVR (e.g., sufficient/insufficient memory capacity, video tuners, etc.) when determining whether to cause a DVR to automatically record TV programs. Instead of, or in addition to, automatically recording TV programs, the IA-DVR functionality may present recommendations to the user of TV programs that may be of interest to the user based on the user's television program viewing behavior and/or based on the other information. A "user" as the term is used herein refers to an individual person or a group of people, such as, for example, members of a single household that share one or more TVs in common or which use one or more STBs in the household. The individual person may explicitly identify themselves via a log-in or they may be implicitly identified via, e.g., a pattern of behavior.

Figure 2:
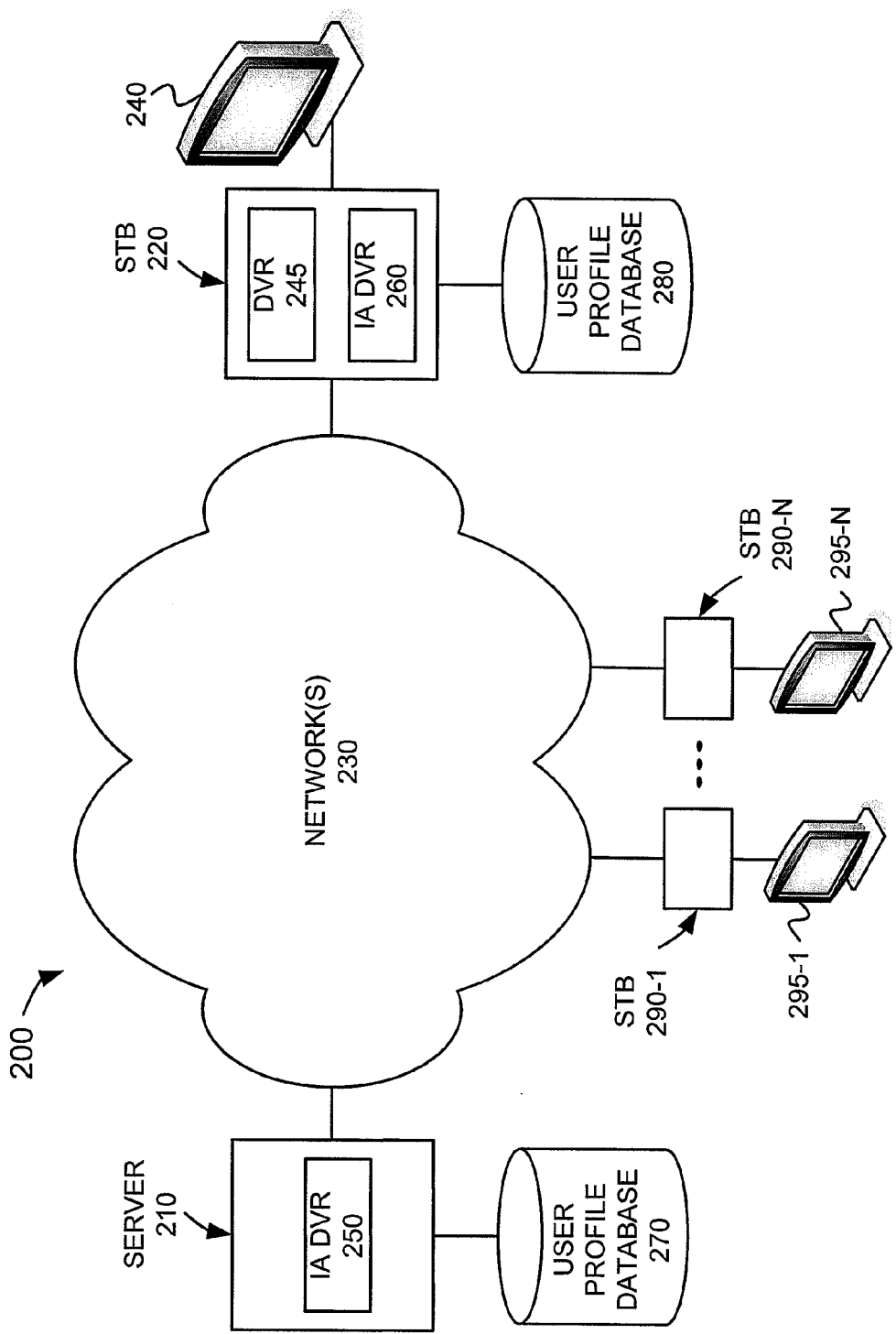
FIG. 2 is a diagram of a network which includes an intelligent automatic DVR functionality according to an exemplary embodiment.

FIG. 2 is a diagram of a network 200 which includes the IA-DVR functionality of FIG. 1 according to an exemplary embodiment. As shown in FIG. 2, network 200 may include a server 210, a set top box (STB) 220 connected to a display device 240 (e.g., a television), a network 230, one or more user profile databases 270 and 280, and STBs 290-1 through 290-N connected to respective display devices 295-1 through 295-N.

STB 220 may include any type of set top box that permits a user to manually select TV programs to view on display device 240 and/or to manually select programs for recording via a DVR. In one implementation, STB 220 may be associated with a DVR 245, which may include functionality for digitally recording TV programs. DVR 245 may reside internal or external to STB 220. In an exemplary embodiment, STB 220 may also be associated with IA DVR functionality 260 that may monitor and record a user's viewing habits, based on the user's interaction with STB 220, and may automatically cause TV programs to be recorded by DVR 245 based on the user's viewing habits and/or based on other information. Though shown in FIG. 2 as an integral function of STB 220, IA DVR 260 may reside external to STB 220 and may communicate with STB 220 via, for example, network 230. IA DVR 260 may store the user's recorded viewing habits, and other information related to the user, in user profile database 280. User profile database 280 may be located external or internal to STB 220. In another implementation, IA DVR 260 or STB 220 may alternatively send the user's recorded viewing habits, and the other information related to the user, to server 210 for storage in user profile database 270. In some implementations, monitoring of the user's viewing habits by IA DVR 260 may only occur with express permission from the user associated with STB 220 or the various users associated with STBs 290-1 through 290-N.

As an alternative to, or in addition to, STB 220 including IA DVR 260, server 210 may include a server entity that may also include IA DVR functionality 250 that may monitor and record a user's TV viewing habits, based on a user's interaction with STB 220, and may automatically cause TV programs to be recorded by DVR 245 based on the user's viewing habits and/or based on other information. IA DVR 250 of server 210 may communicate with STB 220 via network 230 to cause DVR 245 to automatically record selected TV programs. IA DVR 250 may store the user's recorded viewing habits, and other information related to the user, in user profile database 270. In some implementations, monitoring of the user's viewing habits by IA DVR 250 may only occur with express permission from the user associated with STB 220 or the various users associated with STBs 290-1 through 290-N. In this exemplary embodiment, in which IA DVR functionality 250 is associated with server 210, IA DVR 260 may not be associated with STB 220. In another exemplary embodiment in which IA DVR 260 is associated with STB 220, IA DVR 250 may not be associated with server 210. Server 210 may connect with STB 220 and/or STBs 290-1 through 290-N via network 230. Server 210 may also connect, directly or indirectly, to a user profile database 270 and STB 220 may connect, directly or indirectly, to a user profile database 280.

In addition to monitoring and recording the user's viewing habits, IA DVR 250 or IA DVR 260 may monitor the viewing habits of other users via STB's 290-1 through 290-N. Respective users may view TV programs via display devices 295-1 through 295-N associated with STBs 290-1 through 290-N. IA DVR 250 or 260 may monitor this TV viewing behavior (e.g., by communication via network 230) and may use this monitored TV viewing behavior as a basis for automatically recording TV programs at STB 220 or for making TV program recommendations to the user at STB 220. One or more of STBs 290-1 through 290-N may be located at a same location (e.g., a same household, a same place of business, etc.) as STB 220. Thus IA DVR 250/260 may monitor and aggregate the viewing habits associated with the use of multiple STBs in a same household to build a given user profile. Some of STBs 290-1 through 290-N may be located at one or more other locations (e.g., households, places of business, etc.) than STB 220. IA DVR 250/260 may, thus, also monitor the viewing habits associated with the users of those other STBs (e.g., at other households) to build other user profiles. Patterns of commonality among the TV viewing behavior of users associated with STBs 290-1 through 290-N (whether the STBs are located in the same household, or other households, as STB 220), and the user associated with STB 220, may, thus, be used as a basis for automatically recording TV programs or for making program recommendations to the user at STB 220. IA DVR 250/260 may, therefore, monitor and aggregate viewing habits of STBs in a same household, or in a different household, as STB 220 and use those monitored viewing habits as a basis for automatically recording selected TV programs and/or for making recommendations of selected TV programs to a user associated with STB 220. In a situation where one or more of STBs 290-1 through 290-N correspond to additional STBs in a same household as STB 220, these additional STBs may be able to access and view content caused to be recorded by IA DVR 250/260 even though that content may only be stored at STB 220 (e.g., multi-room DVR deployment). IA DVR 250 or 260 may also monitor other devices associated with a user, not only STBs in that user's household. These other devices may include a personal computer used by the user or other devices.

User profile database 270 and/or user profile database 280 may store various data associated with users. Such data may include, for example, monitored TV program viewing behavior associated with a given user, a content interest profile associated with the user that includes an identification of potential topics of TV programming content that may be of interest to the user, an identification of the user's "favorite" TV programs deduced from the user's TV program viewing behavior, and identified TV programs of interest for the user that may be deduced, for example, based on the user's content interest profile (and/or other information including external information sources such as customer account data, demographic data, and/or other sources of behavioral and interest data). In one embodiment, the data stored in user profile database 270 may be organized as a table, with each entry of the table being indexed to a different identified user.

Network(s) 230 may include one or more networks, such as, for example, a local area network (LAN), a wide area network (WAN), a metropolitan area network (MAN), an intranet, the Internet, a wireless satellite network, a cable network, and/or a wireless public land mobile network (PLMN).

Network 200 may include additional, fewer and/or different network components than those depicted in FIG. 2. In one exemplary implementation, STB 220, display device 240 and database 280 may be integrated into a single device.

Figure 3:
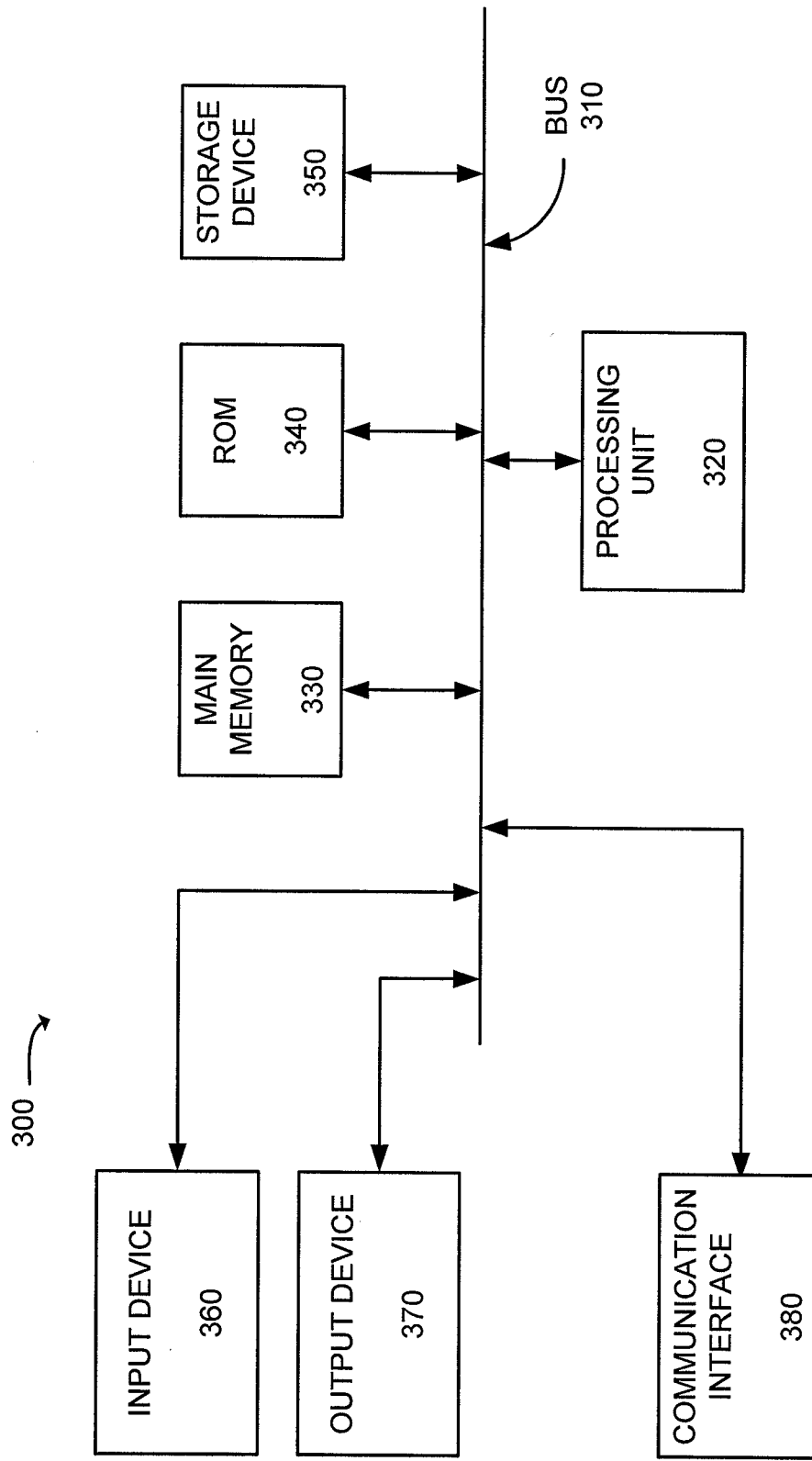
FIG. 3 is a diagram of a set top box or server according to an exemplary implementation.

FIG. 3 is a diagram of exemplary components of a device 300, which may correspond to server 210 or STB 220. Device 300 may include a bus 310, a processing unit 320, a main memory 330, a read only memory (ROM) 340, a storage device 350, an input device 360, an output device 370, and a communication interface 380. Bus 310 may include a path that permits communication among the elements of device 300.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device 360 may include one or more mechanisms that permit an operator to input information to device 300, such as, for example, a keypad or a keyboard, voice recognition and/or biometric mechanisms, etc. Output device 370 may include one or more mechanisms that output information to the operator, including a display, a speaker, etc. Communication interface 380 may include any transceiver-like mechanism that enables device 300 to communicate with other devices and/or systems. For example, communication interface 380 may include mechanisms for communicating with another device or system via a network, such as network 230.

Device 300 may perform certain operations or processes, as will be described in detail below. Device 300 may perform these operations in response to processing unit 320 executing software instructions contained in a computer-readable medium, such as memory 330. A computer-readable medium may be defined as a physical or logical memory device.

The software instructions may be read into memory 330 from another computer-readable medium, such as data storage device 350, or from another device via communication interface 380. The software instructions contained in memory 330 may cause processing unit 320 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

FIG. 4 illustrates an exemplary table 400 that may be stored in user profile database 270 and/or 280. Table 400 may include one or more entries 405, each of which may include, for example, a user identifier 410, viewing behavior information 415, a content interest profile 420, other information 425, favorite programs 430, and/or programs of interest 435.

User identifier 410 may uniquely identify a user associated with a specific entry 405 of table 400. Viewing behavior information 415 may include data associated with monitoring of the user's TV program viewing behavior. Such data may include, for example, data associated with programs that the user has watched, the days the user watched those programs, and/or the times that the user watched those programs. The TV programs may be "streamed programs" (i.e., programs streamed to the STB from a television program provider or programs that have been recorded on DVR) such as, for example, broadcast TV programs, video on demand programs, or DVR recorded programs. The data may further include information identifying the channel(s) that were watched by the user. Content interest profile 420 may include data associated with topics of TV program content that may be of interest to the user. Such topics may include, for example, documentaries, dramas, situation comedies, etc. Other information 425 may include data associated with viewing behavior, topics of TV program content, or other types of information that is associated with other users that may be relevant to the user identified by user identifier 410. For example, if another user watches some of the same TV programs as the user identified by user identifier 410, then other TV programs that the other user watches, which the user identified by user identifier 410 does not currently watch, may be of interest to the user identified by user identifier 410. Favorite programs 430 may include data that identifies TV programs identified by IA DVR 250 or 260 as being a "favorite" of the user identified by user identifier 410 based on that user's TV viewing behavior and/or other information. Programs of interest 435 may include data associated with TV programs that IA DVR 250 or 260 may estimate as being of interest to the user identified by user identifier 410. IA DVR 250 or 260 may estimate the programs of interest based on the user's viewing behavior information 415, the user's content interest profile 420, the user's other information 425, and/or the user's favorite programs 430. IA DVR 250 or 260 may suspend monitoring a user's television viewing behavior and/or may possibly remove recently obtained monitored information when IA DVR 250 or 260 determines that the user has not interacted with STB 220 for a duration that exceeds a threshold value.

Figure 5:
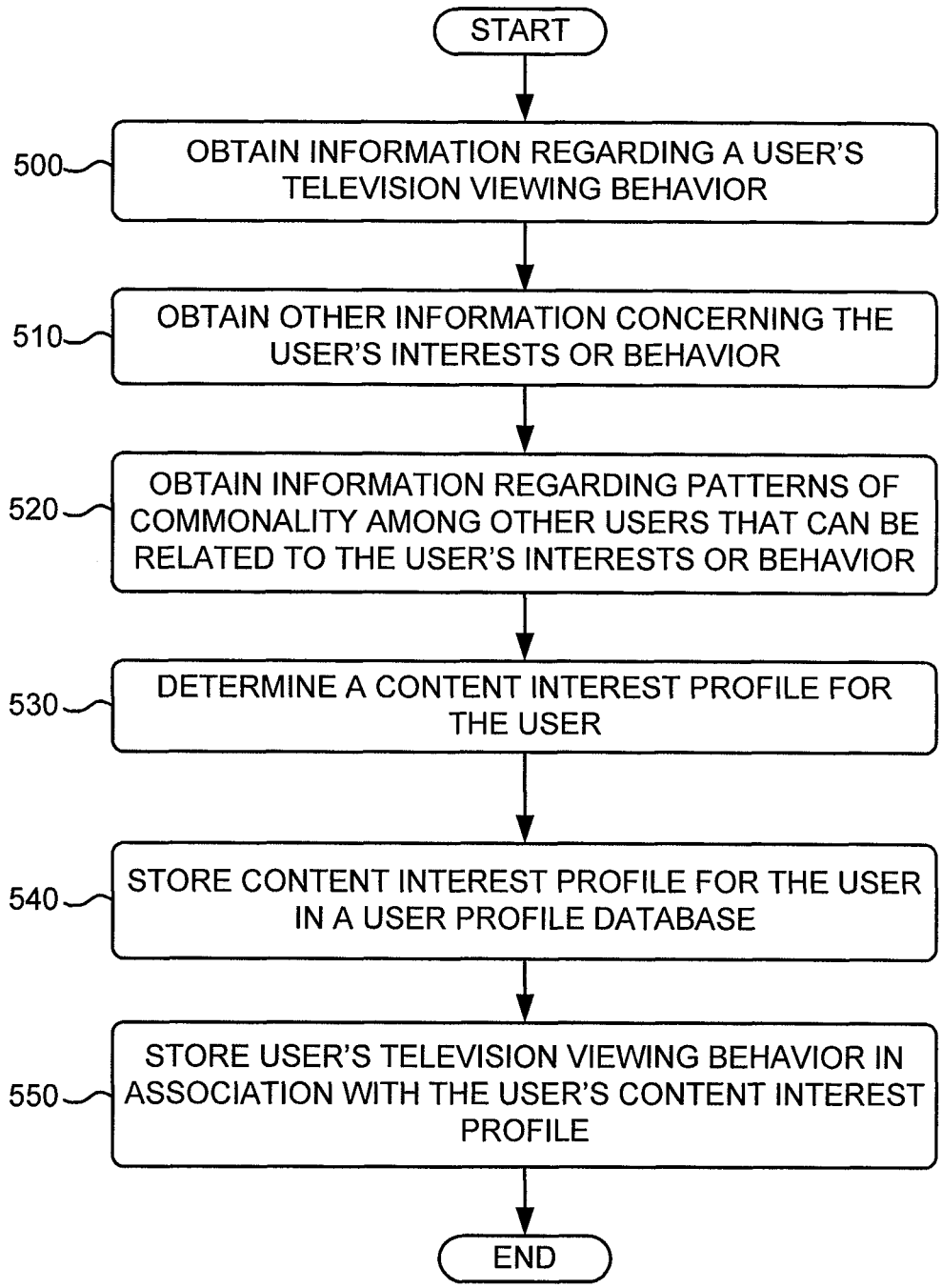
FIG. 5 is a flow diagram illustrating an exemplary process for obtaining information regarding a user's television viewing behavior, and other information, for use in the exemplary process of FIG. 6.

FIG. 5 is a flow diagram illustrating an exemplary process for obtaining information related to a user's TV viewing interests and storing that information in user profile database 270 and/or 280. The exemplary process of FIG. 5 may be performed by IA DVR 250 of server 210 and/or by IA DVR 260 of STB 220.

The exemplary process may begin with obtaining information regarding a user's television viewing behavior (block 500). In one implementation, IA DVR 250 may interact with STB 220 to monitor and obtain the information regarding the user's television viewing behavior. In another implementation, IA DVR 260 may monitor and obtain information, at STB 220, regarding the user's television viewing behavior. For example, IA DVR 250 or 260 may obtain information indicating what channels the user viewed, how long the user viewed those channels, and specified times at which the user viewed those channels. This information obtained by IA DVR 250 or 260 may, in some implementations, be obtained in real-time or in near real-time. IA DVR 250 or 260 may, additionally, obtain TV program guide information (including video on demand (VOD) program guide information) that may then be cross-referenced with the information indicating what channels the user viewed, how long the user viewed those channels, and the specified times at which the user viewed those channels to identify specific TV programs that the user has been viewing (e.g., American Idol, 24, 60 Minutes, etc.). If there are multiple STBs in the user's home, TV viewing behavior associated with each STB may be obtained by IA DVR 250 or 260. In some implementations, IA DVR 250 or 260 may ascertain that a user is actually watching a given TV program (i.e., the STB has not just been left on) based on whether the user has recently interacted in any way with STB 220. For example, STB 220 may determine whether the user has interacted with a keypad associated with STB 220, or with a remote control that may be used to control STB 220 and/or display device 240, during or after a given TV program.

Other information concerning the user's interests or behavior may also be obtained (block 510). For example, information may be obtained regarding what TV programs the user has manually programmed to record via the DVR associated with STB 220. As another example, if STB 220 has the capability of accessing the Internet, then IA DVR 250 or 260 may monitor the user's web browsing and ascertain which websites and/or web pages the user has accessed. IA DVR 250 or 260 may then identify additional interests of the user based on the content of the accessed websites and/or web pages. This other information concerning the user's interests or behavior may further include information explicitly identified by the user. For example, the user may, via a user interface associated with STB 220, or some other device (e.g., a personal computer with Internet access), identify TV program categories (reality TV, dramas, comedies), actors/actresses that the user likes, important keywords (UFOs, World War II, etc.) and/or other information that the user explicitly wants to identify as being of interest. This other information concerning the user's interests may further include information regarding the user's interaction with programs recorded by DVR 245. For example, if the user watches a program recorded by DVR 245 and then saves it, or watches it multiple times, then this interaction may indicate that the TV program is of interest to the user. The information concerning the user's interests or behavior may be derived or collected from other sources than the user's web browsing activity via STB 220, and may include information associated with the user's entire household and not just the user. For example, the information may be obtained from an Internet connected personal computer used by the user for web browsing. The information may further include demographic data, market segment data etc. associated with the user or the user's household. The other information obtained in block 510 may be stored in "other information" 425 of table 400.

Information regarding patterns of commonality among other users that can be related to the user's interests or behavior may be obtained (block 520). As previously described, in addition to monitoring and recording a user's viewing habits, IA DVR 250 or IA DVR 260 may monitor the viewing habits of other users via STBs 290-1 through 290-N. IA DVR 250 or IA DVR 260 may communicate with STBs 290-1 through 290-N via network 230 to monitor and record the viewing habits of other users. Respective users may view TV programs via display devices 295-1 through 295-N associated with STBs 290-1 through 290-N. Patterns of commonality of these other viewers, and the current viewer, may be ascertained (e.g., using collaborative filtering algorithms). For example, if another user watches some of the same TV programs as the user identified by user identifier 410, then other TV programs that the other user watches, which the user identified by user identifier 410 does not currently watch, may be of interest to the user identified by user identifier 410. As another example, a user may desire to have programs recorded based on the monitored viewing behavior of other users (e.g., a friend, a group of friends, or a group of individuals (e.g., people living in your town), etc.). As described above, one or more of STBs 290-1 through 290-N may be located at a same location (e.g., a same household, a same place of business, etc.) as STB 220 or some of STBs 290-1 through 290-N may be located at one or more other locations (e.g., other households, other places of business, etc.) than STB 220. IA DVR 250/260 may, thus, also monitor the viewing habits associated with the users of those other STBs (e.g., at other households) to build other user profiles. Patterns of commonality among the TV viewing behavior of users associated with STBs 290-1 through 290-N (whether the STBs are located in the same household, or other households, as STB 220), and the user associated with STB 220, may, thus, be used for collaborative filtering. The information regarding patterns of commonality obtained in block 520 may be stored in "other information" 425 of table 400.

A content interest profile for the user may be determined (block 530). The content interest profile may, for example, generically identify TV program content topics that may be of interest to the user. The content interest profile may be determined, for example, based on the information regarding a user's television viewing behavior obtained in block 500. The identified topical interests may subsequently be used to identify other related content that may be of interest to the user. For example, a user that watches the TV program "Survivor" may have the topic "reality TV" stored as a topical interest in the user's content interest profile. The content interest profile for the user may be stored in user profile database 270 and/or 280 (block 540).

The user's television viewing behavior may be stored in association with the user's content interest profile (block 550). For example, the information obtained in block 500 above may be stored in viewing behavior information 415 of table 400 and information obtained in blocks 510 and 520 may be stored in other information 425 of table 400.

The exemplary process of FIG. 5 may be selectively and/or periodically repeated and/or incrementally updated to maintain current information in table 400 of user profile database 270 or 280 for each user identified in table 400. Moreover, user profile database 270 or 280 may maintain user viewing information that occurred over the course of days, weeks, months, years, etc.

Figure 6:
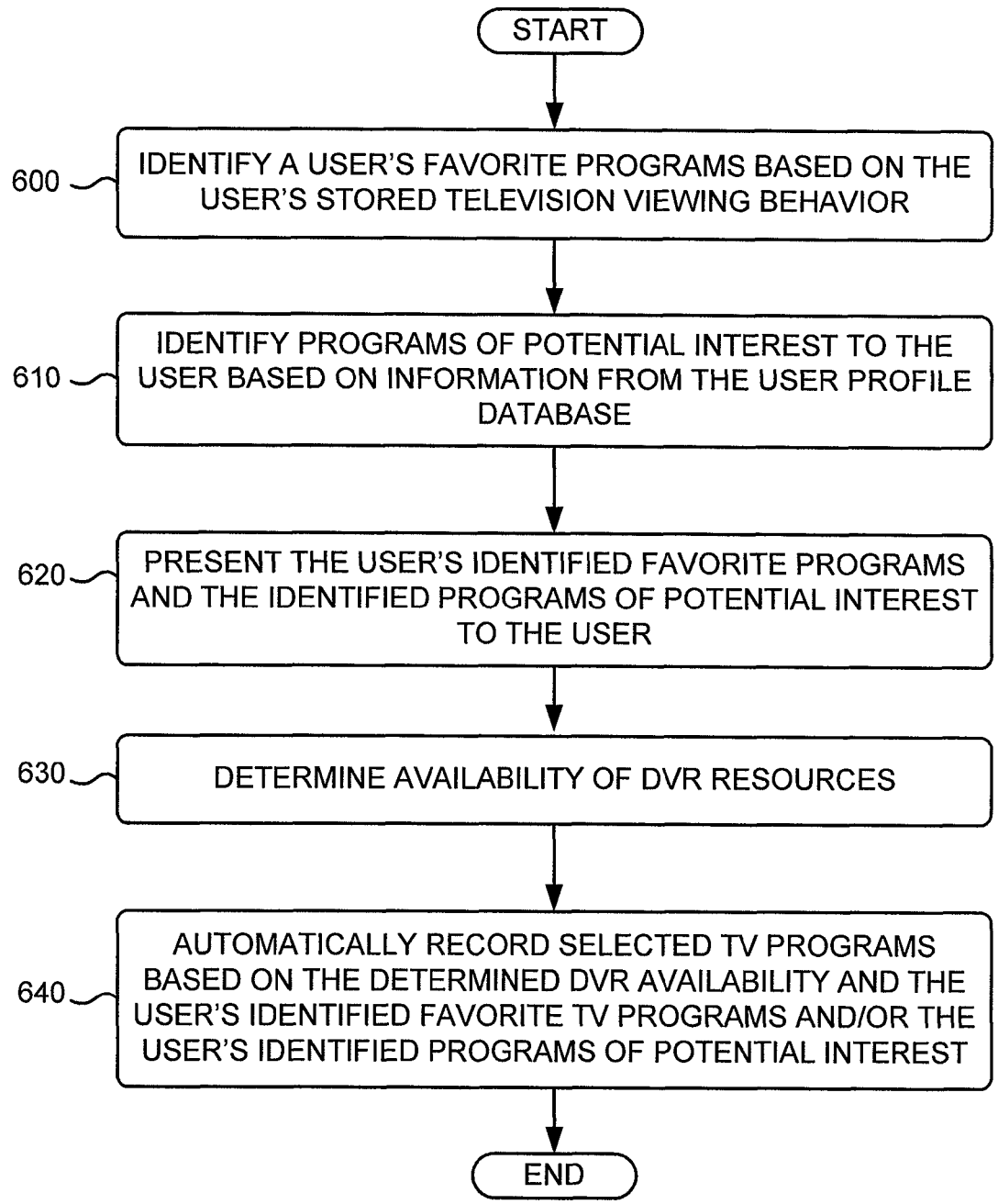
FIG. 6 is a flow diagram illustrating an exemplary process for automatically recording selected television programs based on a user's favorite TV programs and/or programs of potential interest to the user identified using the information obtained in the exemplary process of FIG. 5.

FIG. 6 is a flow diagram illustrating an exemplary process for automatically recording selected TV programs and/or programs of potential interest to the user based on the user's television viewing behavior and/or based on other information. The exemplary process of FIG. 6 may, in some embodiments, also present the user's favorite programs and/or recommended programs based on the user's television viewing behavior and/or based on other information. The exemplary process of FIG. 6 may be performed by IA DVR 250 associated with server 210 or TA DVR 260 associated with STB 220. Each of the blocks described below may be optionally implemented in the exemplary process of FIG. 6. For example, in one exemplary embodiment, block 620 may be omitted from the process of FIG. 6.

The exemplary process may begin with the identification of a user's favorite programs based on the user's stored television viewing behavior (block 600). Various algorithms may be used to identify a user's favorite programs based on the viewing behavior information 415 retrieved from table 400. In one exemplary embodiment, a frequency (e.g., relative frequency) with which a user views a given TV program and/or series may be measured to identify the user's favorite programs. Those TV programs with a higher measured frequency of being viewed may be identified as the user's favorite TV programs. The programs identified as being favorites of the user may be stored in favorite programs 430 of table 400.

Programs of potential interest to the user may be identified based on the information associated with the user stored in the user profile database 270 or 280 (block 610). IA DVR 250 or 260 may evaluate various TV programs, and their associated content, against information associated with the user stored in user profile database 270 or 280. For example, the user's content interest profile 420 or other information 425 may be retrieved from table 400 of user profile database 270 or 280 and used to estimate programs of potential interest to the user. The estimated TV programs of potential interest to the user may be stored in programs of interest 435 in table 400 of database 270 or 280.

Figure 7:
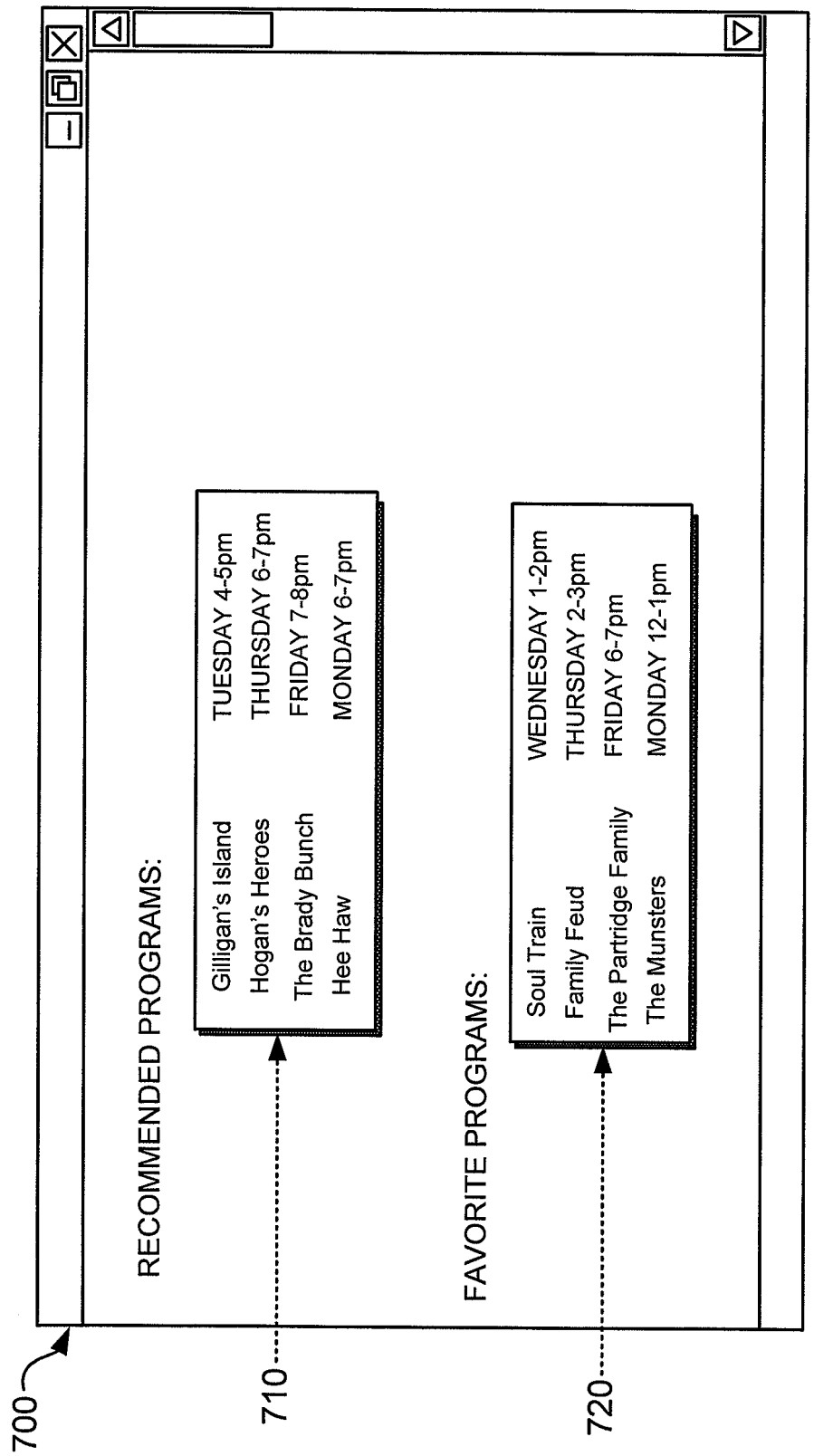
FIG. 7 is a diagram of an exemplary user interface that may display recommended programs or identified favorite programs to a given user.

The user's identified favorite programs from block 600 and the user's identified programs of potential interest from block 610 may be provided to the user (block 620). In one embodiment, a user interface may be provided via STB 220 and display device 240 that presents the programs of potential interest and the programs identified as being the user's favorites, to the user. For example, as depicted in FIG. 7, a user interface 700 may present a list of the programs of potential interest to the user as "recommended programs" 710 and a list of the user's programs identified favorites as "favorite programs" 720. User interface 700 may be accessible via STB 220 and display device 240 or via another computing device (e.g., a desktop or laptop computer) via the Internet.

The availability of DVR resources may be determined (block 630). The resources may include, for example, available memory storage capacity, channel tuning capacity (e.g., TV tuners), and/or other system resources. The resource availability determination may also take into account current and scheduled use of the DVR resources. For example, IA DVR 250 or 260 may determine if the DVR associated with STB 220 has sufficient recording capacity available to record the program(s) of potential interest and/or the "favorite" program(s). This determination may include a determination of current recording capacity (e.g., if the program(s) is to be recorded now) or future recording capacity (e.g., if the program(s) is going to be recorded at some specified time in the future). "Sufficient recording capacity" may, for example, include a sufficient quantity of available memory. The determination of available DVR resources may also include determining whether adequate channel tuning capacity exists. For example, IA DVR 250/260 may determine if a user is currently watching a TV program on one channel (i.e., consuming one tuner) and the DVR is scheduled (now or during the lifetime of the target TV program) to record another channel (i.e., consuming another tuner) so that sufficient tuner resources may not be available to record another TV program. The determination of available DVR resources may further include determining current channel selections of multiple set top boxes in a given household. For example, if a viewer is watching a first TV program (e.g., American Idol) at a first set top box in one room, then a DVR in another room of the house may not need to record that first TV program.

Selected TV programs may be automatically recorded based on the determined DVR availability and the user's identified favorite TV programs and/or the user's identified programs of potential interest (block 640). IA DVR 250 or 260 may retrieve favorite programs 430 or programs of interest 435 from table 400 of database 270 or 280 and may automatically, without user intervention or request (e.g., without the user manually programming the DVR), record selected TV programs based on the data retrieved from database 270 or 280. For example, if analysis of programs of interest data 435 retrieved from table 400 indicates that the user may like college basketball programs, then, if sufficient DVR memory capacity is available, IA DVR 250 or 260 may cause the DVR associated with STB 220 to automatically record every game of the NCAA college basketball championships that is televised during "March Madness." In the case of a "favorite program" that the user typically watches but failed to manually program the DVR to record, IA DVR 250 or 260 may automatically select this program for recording based on favorite programs data 430 retrieved from table 400. In one exemplary embodiment, the automatic recording of a TV program may further be based on whether the user is currently watching the program. For example, if the program "American Idol" is identified as a favorite program of a given user, but the user is currently watching "American Idol," then IA DVR 250 or 260 may ascertain this and may not automatically record the program.

Figure 8:
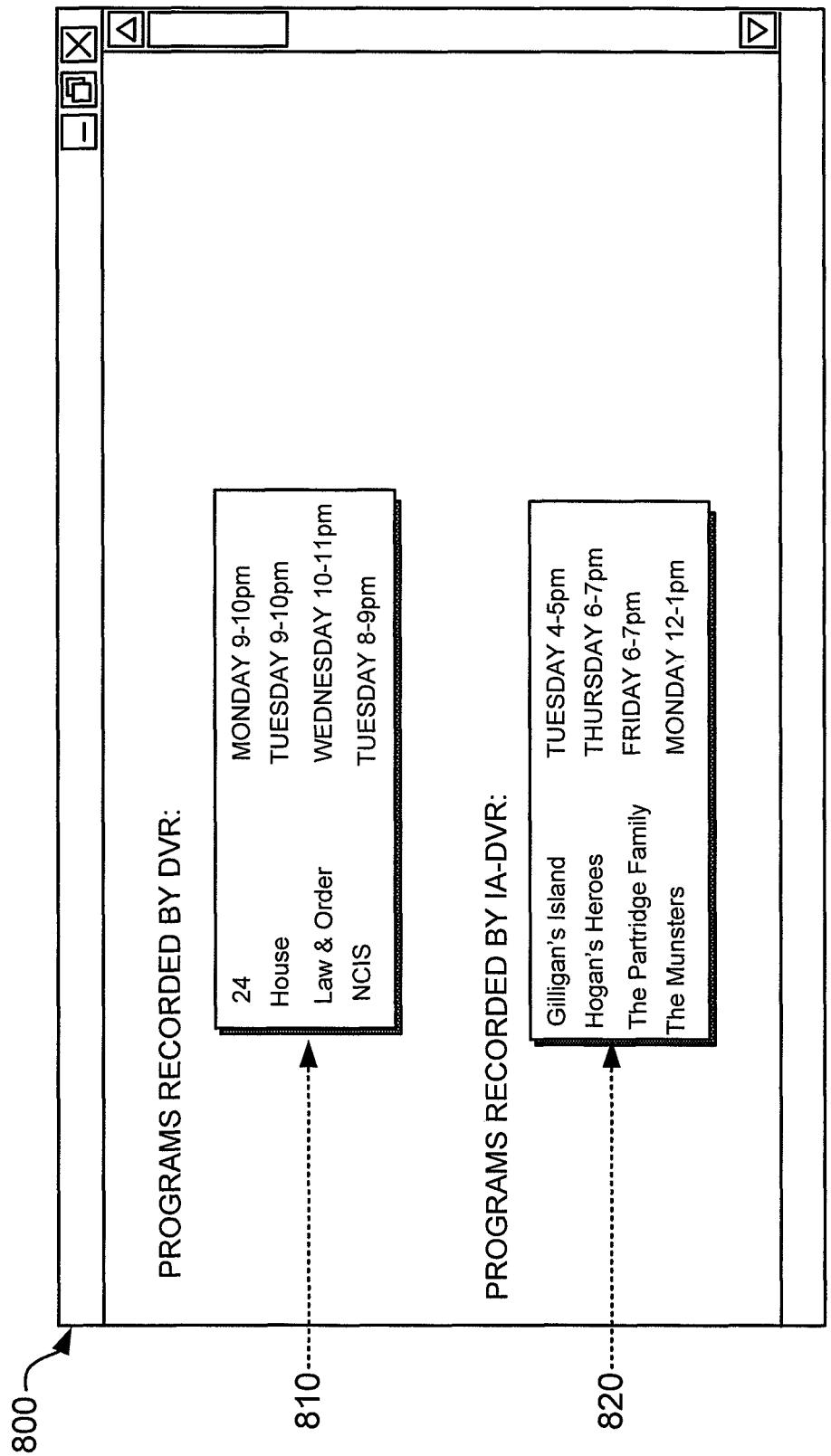
FIG. 8 is a diagram of another exemplary user interface that may display programs recorded by a DVR based on explicit requests of a user and programs automatically recorded by a DVR without any explicit request by the user.

A user interface also may be provided, for example, via STB 220 and TV 240, which presents a list of the programs recorded by the DVR via manual programming by the user and a list of programs recorded by IA-DVR 250 or 260 via automatic programming and recording. For example, as depicted in FIG. 8, a user interface 800 may present a list of the programs 810 recorded by the DVR via manual programming by the user and a list of programs 820 recorded automatically by the IA-DVR 250 or 260 without user intervention. User interface 800 may be accessible via STB 220 and TV 240 or via another computing device (e.g., a desktop or laptop computer) via the Internet.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, while series of blocks have been described with regard to FIGS. 5 and 6, the order of the blocks may be modified in other embodiments. Further, non-dependent blocks may be performed in parallel. While exemplary embodiments described herein have described IA DVR 250 or 260 as automatically recording certain TV programs, in some embodiments the user may utilize a user interface to configure aspects of the IA DVR functionality. For example, the user may utilize the user interface to turn on or off the capability of the IA DVR to automatically record TV programs. In this instance, the user may desire to maintain as much free available memory associated with DVR 245 as possible and may not wish TV programs to be automatically recorded.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    monitoring, by a first device and for a period of time, first television program viewing behavior of a first user after the first user provided express permission to monitor the first television program viewing behavior;
    determining, by the first device and for the period of time, an amount of interaction by the first user with the first device;
    determining, by the first device, that the first user viewed a first television program displayed during the period of time based on the first television program viewing behavior of the first user and the amount of the interaction;
    monitoring, by the first device, second television program viewing behavior of a second user via a second device, the second user being different from the first user;
    determining, by the first device, that the second user viewed the first television program based on the second television program viewing behavior;
    determining, by the first device, a pattern of commonality among the first user and the second user based on that the first user viewed the first television program and that the second user viewed the first television program;
    determining, by the first device, that the second user is viewing a second television program, the second television program being different from the first television program;
    determining, by the first device, that the first user is not viewing the second television program;
    automatically causing, by the first device and after determining the pattern of commonality, the second television program to be recorded based on determining that the second user is viewing the second television program and that the first user is not viewing the second television program;
    recording, by the first device, one or more additional television programs based on a selection of the one or more additional television programs by the first user; and
    providing, for presentation to the first user:
        a first list of television programs that identifies television programs previously recorded based on the selection, the first list of television programs including information identifying the one or more additional television programs, and
        a second list of television programs that identifies television programs previously automatically recorded, the second list of television programs including information identifying the second television program.

2. The method of claim 1,
    where the first device includes a first set top box, and
    where the second device includes a second set top box.

3. The method of claim 2, where the first set top box and the second set top box are in a single household.

4. The method of claim 1, further comprising:
identifying topical interests associated with the first user based on the first television program viewing behavior; and
automatically causing at least one other television program to be recorded based on the topical interests.

5. The method of claim 1,
where the first device includes a first set top box,
where the second device includes a second set top box, and
where the first set top box and the second set top box are in different households.

6. The method of claim 1,
where the method further comprises:
monitoring behavior, of the first user, based on other devices associated with the first user to obtain additional monitored information; and
identifying the second television program based on the additional monitored information.

7. The method of claim 1, further comprising:
identifying the second television program as a favorite program of the second user.

8. The method of claim 1,
where the first device includes a first set top box,
where the second device includes a second set top box that is different from the first set top box,
where determining that the second user is viewing the second television program includes:
determining, at a time the second television program is scheduled to be broadcast, a current channel selection of the second set top box, and
determining that the second user is viewing the second television program based on the current channel selection of the second set top box.

9. The method of claim 1, further comprising:
determining, before automatically recording the second television program, that digital recording capacity is available when the second television program is scheduled to be broadcast.

10. The method of claim 1, further comprising:
providing, for display, the second television program to the first user via a user interface.

11. The method of claim 1, further comprising:
automatically providing recommendations to the first user, via a user interface, for recording one or more television programs based on the first television program viewing behavior.

12. A system comprising:
a processor to:
monitor first television program viewing behavior of a first user after the first user provided express permission to monitor the first television program viewing behavior,
determine an amount of interaction by the first user with a first set top box associated with the first user,
determine that the first user viewed a first program based on the first television program viewing behavior and the amount of the interaction,
monitor second television program viewing behavior of a second user via a second set top box,
the second user being different from the first user, and
the second set top box being different from the first set top box,
determine that the second user viewed the first television program based on the second television program viewing behavior,
determine a pattern of commonality among the first user and the second user based on that the first user viewed the first television program and that the second user viewed the first television program,
determine that the second user is viewing a second television program,
the second television program being different from the first television program,
determine that the first user is not viewing the second television program,
cause, after determining the pattern of commonality and that the first user is not viewing the second television program, the second television program to be recorded without intervention by the first user,
record one or more additional television programs based on a selection by the first user; and
provide, for presentation:
a first list of television programs that identifies television programs previously recorded based on the selection,
the first list of television programs including information identifying the one or more additional television programs, and
a second list of television programs that identifies television programs previously automatically recorded,
the second list of television programs including information identifying the second television program.

13. The system of claim 12, where the first set top box and the second set top box are associated with a single household.

14. The system of claim 12, where the processor is further to:
identify topical interests associated with the first user based on the first television program viewing behavior,
identify one or more other television programs based on the topical interests, and
cause at least one of the one or more other television programs to be recorded.

15. The system of claim 12, where the processor is further to:
identify the second television program based on preference data associated with the first user before causing the second television program to be automatically recorded.

16. The system of claim 12, where the processor is further to:
measure a frequency with which the user views the first television program based on the first television program viewing behavior, and
identify the first television program as a favorite program of the first user based on the frequency.

17. A non-transitory computer-readable medium storing instructions, the instructions comprising:
one or more instructions which, when executed by at least one processor, cause the at least one processor to:
receive, from a first user, an express permission to monitor first television viewing behavior of the first user;
determine that the express permission to monitor the first television viewing behavior of the first user has been received from the first user;
monitor, based on determining that the express permission has been received from the first user, the first television viewing behavior of the first user to obtain first monitored information;
monitor second television viewing behavior of a second user to obtain second monitored information;
suspend monitoring of the first television viewing behavior of the first user, suspending the monitoring being based on an amount of interaction between the first user and a first device associated with the first user during a first period of time that is associated with a first program provided to the first user during the first period of time, and monitoring of the first television viewing behavior of the first user being suspended when the amount of interaction is less than a threshold value;

remove, from the first monitored information, a portion of monitored information obtained during the first period of time to obtain modified first monitored information when the amount of interaction is less than the threshold value, the portion of monitored information being associated with the first program;

store, after removing the portion of monitored information, the modified first monitored information without the portion of monitored information;

measure a frequency, based on the modified first monitored information, with which the first user views a television program;

identify the television program as a favorite program of the first user based on the frequency;

identify, based on a pattern of commonality, the second user as being interested in the favorite program of the first user;

enable a second device of the second user to identify the favorite program of the first user to the second user; and automatically cause recording of the television program when the first user fails to manually program the first device to record the television program.

18. A method comprising:

receiving, by a device and from a user, an express permission to monitor television program viewing behavior of the user;

determining, by the device, that the express permission to monitor the television viewing behavior of the user has been received from the user;

monitoring, by the device and based on determining that the express permission has been received from the user, the television program viewing behavior of the user to obtain television program viewing data associated with the user;

determining, by the device and based on an amount of interaction between the user and the device during a particular period of time, whether the user viewed a particular television program associated with a portion of the television program viewing data corresponding to the particular period of time;

removing, by the device and when the user did not view the television program, the portion of the television program viewing data corresponding to the particular period of time to form modified television program viewing data;

storing, after removing the portion of the television program viewing data corresponding to the particular period of time, the modified television program viewing data without the portion of the television program viewing data corresponding to the particular period of time;

automatically, by the device, causing recording of one or more first television programs based on the modified television program viewing data;

recording, by the device, one or more second television programs based on a selection by the first user; and providing, by the device and to the user:

a first list of television programs that identifies television programs previously recorded based on the selection, the first list of television programs including information identifying the one or more second television programs, and a second list of television programs that identifies television programs previously automatically recorded, the second list of television programs including information identifying the one or more first television programs.

19. The method of claim 1, where the first device comprises a first set top box, and where determining the amount of interaction comprises:

determining the amount of interaction based on determining whether the first user has interacted with a keypad or a remote control associated with the first set top box to control the first set top box.

20. The method of claim 1, where the first device comprises a first set top box, where determining the amount of interaction further comprises:

determining the amount of interaction by the first user with the first set top box during a time period, and where the time period includes:

a first period of time during the first television program, and a second period of time immediately following the first television program.

21. The non-transitory computer-readable medium of claim 17, where the instructions further comprise:

one or more instructions which, when executed by the at least one processor, cause the at least one processor to:

determine interaction of the first user with a keypad or a remote control associated with the first device, and determine the amount of interaction between the first user and the first device based on the interaction of the first user with the keypad or the remote control associated with the first device.

22. The non-transitory computer-readable medium of claim 17, where the first device is a first set top box, where the second device is a second set top box, and where the first set top box and the second set top box are in a single household.

23. The method of claim 18, further comprising:

monitoring other television program viewing behavior of another user via another device, and providing recommendations based on the modified television program viewing data and the other television program viewing behavior.

24. The method of claim 18, further comprising:

suspending the monitoring of the television program viewing behavior of the user when the user did not view the television program.

* * * * *